(12) United States Patent
Lehtiniemi et al.

(10) Patent No.: US 9,269,090 B2
(45) Date of Patent: Feb. 23, 2016

(54) METHOD, APPARATUS AND COMPUTER PROGRAM PRODUCT FOR PROVIDING INDICATIONS REGARDING RECOMMENDED CONTENT

(75) Inventors: Arto Juhani Lehtiniemi, Lempaala (FI); Antti Eronen, Tampere (FI); Jukka Antero Holm, Tampere (FI)

(73) Assignee: Nokia Technologies Oy, Espoo (FI)

( * ) Notice: Subject to any disclaimer, the term of this patent is extended or adjusted under 35 U.S.C. 154(b) by 1630 days.

(21) Appl. No.: 12/193,475

(22) Filed: Aug. 18, 2008

(65) Prior Publication Data

US 2010/0042932 A1   Feb. 18, 2010

(51) Int. Cl.
G06Q 30/02      (2012.01)
G06F 3/0481     (2013.01)
G06F 3/0482     (2013.01)

(52) U.S. Cl.
CPC .............. *G06Q 30/02* (2013.01); *G06F 3/0481* (2013.01); *G06F 3/0482* (2013.01)

(58) Field of Classification Search
CPC ...... G06F 3/0481; G06F 3/0482; G06Q 30/02
USPC ......... 715/810, 811, 817, 825, 835, 837, 838, 715/846
See application file for complete search history.

(56) References Cited

U.S. PATENT DOCUMENTS

| | | | |
|---|---|---|---|
| 7,220,910 B2* | 5/2007 | Plastina et al. | 84/615 |
| 7,363,591 B2* | 4/2008 | Goldthwaite et al. | 715/763 |
| 7,600,192 B1* | 10/2009 | Hashimoto et al. | 715/802 |
| 2002/0142722 A1* | 10/2002 | Gutta et al. | 455/45 |
| 2004/0068552 A1* | 4/2004 | Kotz et al. | 709/218 |
| 2005/0144637 A1 | 6/2005 | Shikata et al. | |
| 2005/0251758 A1* | 11/2005 | Cummins et al. | 715/838 |
| 2006/0085818 A1* | 4/2006 | Bodlaender et al. | 725/46 |
| 2006/0112335 A1* | 5/2006 | Hofmeister et al. | 715/701 |
| 2006/0156326 A1* | 7/2006 | Goronzy et al. | 725/13 |
| 2006/0204940 A1* | 9/2006 | Okuzawa | 434/307 A |
| 2006/0250994 A1* | 11/2006 | Sasaki et al. | 370/264 |
| 2007/0094292 A1 | 4/2007 | Kataoka | |
| 2008/0147711 A1* | 6/2008 | Spiegelman et al. | 707/102 |
| 2009/0019398 A1* | 1/2009 | Hansson et al. | 715/838 |

(Continued)

FOREIGN PATENT DOCUMENTS

| | | |
|---|---|---|
| CN | 1898950 A | 1/2007 |
| EP | 1 492 020 A1 | 12/2004 |

(Continued)

OTHER PUBLICATIONS

*The Music Genome Project®, Pandora Radio,* available at http://www.pandora.com/mgp/shtml, dated Oct. 7, 2008, 2 pages.

(Continued)

*Primary Examiner* — Tuyetlien T Tran
(74) *Attorney, Agent, or Firm* — Ditthavong & Steiner, P.C.

(57) ABSTRACT

An apparatus for providing indications regarding recommended content may include a processor. The processor may be configured to receive an indication of a recommended content item, determine a recommendation criteria associated with the recommended content item, select a graphical symbol for presentation in association with the recommended content item in which the graphical symbol is indicative of the recommendation criteria associated with the recommended content item, and provide for display of the graphical symbol.

28 Claims, 6 Drawing Sheets

(56) References Cited

U.S. PATENT DOCUMENTS

| | | |
|---|---|---|
| 2009/0037822 A1* | 2/2009 | Kandekar et al. ............. 715/733 |
| 2009/0119614 A1* | 5/2009 | Tienvieri et al. ............. 715/786 |
| 2009/0177989 A1* | 7/2009 | Ma et al. ....................... 715/766 |

FOREIGN PATENT DOCUMENTS

| | | | |
|---|---|---|---|
| EP | 1 699 236 | A1 | 9/2006 |
| EP | 1 753 241 | A2 | 2/2007 |
| EP | 1 909 194 | A1 | 4/2008 |
| JP | 2008/152606 | | 7/2008 |
| JP | 2008/187575 | | 8/2008 |
| WO | 03/104940 | A2 | 12/2003 |

OTHER PUBLICATIONS

International Search Report and Written Opinion, PCT/FI2009/050661, Dec. 18, 2009, pp. 1-14.

Rejection Decision for related Chinese Patent Application No. 200980132055.5 dated Aug. 5, 2013, 8 pages (English Language Summary Included).

* cited by examiner

METHOD, APPARATUS AND COMPUTER PROGRAM PRODUCT FOR PROVIDING INDICATIONS REGARDING RECOMMENDED CONTENT

TECHNOLOGICAL FIELD

Embodiments of the present invention relate generally to communications technology and, more particularly, relate to apparatuses, methods and computer program products for enabling the provision of indications regarding recommended content.

BACKGROUND

Communication devices are becoming increasingly ubiquitous in the modern world. In particular, mobile communication devices seem to be particularly popular with people of all ages, socioeconomic backgrounds and sophistication levels. Accordingly, users of such devices are becoming increasingly attached to their respective mobile communication devices. Whether such devices are used for calling, emailing, sharing or consuming media content, gaming, navigation or various other activities, people are more connected to their devices and consequently more connected to each other and to the world at large.

Due to advances in processing power, memory management, application development, power management and other areas, communication devices, such as computers, mobile telephones, cameras, personal digital assistants (PDAs), media players and many others are becoming more capable. Furthermore, many such devices are becoming capable of performing tasks associated with more than one of the above listed devices and other tasks as well. Thus, for example, users of such devices often have a robust capacity to generate, consume, recommend and share content.

BRIEF SUMMARY OF EXAMPLE EMBODIMENTS

A method, apparatus and computer program product are therefore provided that may enable the provision of a graphic symbol to indicate recommendation criteria with respect to recommended content items. Thus, for example, a user may be able to know something about a recommend content item based on the recommendation criteria.

In one example embodiment, a method of providing indications regarding recommended content is provided. The method may include receiving an indication of a recommended content item, determining a recommendation criteria associated with the recommended content item, selecting a graphical symbol for presentation in association with the recommended content item in which the graphical symbol is indicative of the recommendation criteria associated with the recommended content item, and providing for display of the graphical symbol.

In another example embodiment, a computer program product for providing indications regarding recommended content is provided. The computer program product may include at least one computer-readable storage medium having computer-executable program code portions stored therein. The computer-executable program code portions may include a first program code instructions, second program code instructions, third program code instructions and fourth program code instructions. The first program code instructions may be for receiving an indication of a recommended content item. The second program code instructions may be for determining a recommendation criteria associated with the recommended content item. The third program code instructions may be for selecting a graphical symbol for presentation in association with the recommended content item in which the graphical symbol is indicative of the recommendation criteria associated with the recommended content item. The fourth program code instructions may be for providing for display of the graphical symbol.

In another example embodiment, an apparatus for providing indications regarding recommended content is provided. The apparatus may include a processor that may be configured to receive an indication of a recommended content item, determine a recommendation criteria associated with the recommended content item, select a graphical symbol for presentation in association with the recommended content item in which the graphical symbol is indicative of the recommendation criteria associated with the recommended content item, and provide for display of the graphical symbol.

In yet another example embodiment an apparatus for providing indications regarding recommended content is provided. The apparatus may include means for receiving an indication of a recommended content item, means for determining a recommendation criteria associated with the recommended content item, means for selecting a graphical symbol for presentation in association with the recommended content item in which the graphical symbol is indicative of the recommendation criteria associated with the recommended content item, and means for providing for display of the graphical symbol.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "content item," "information" and similar terms may be used interchangeably to refer to data capable of being transmitted, received and/or stored in accordance with embodiments of the present invention. Moreover, the term "example", as used herein, is not provided to convey any qualitative assessment, but instead merely to convey an illustration of an example. Thus, use of any such terms should not be taken to limit the spirit and scope of embodiments of the present invention.

As discussed above, users may desire to know some information about recommended content items. Accordingly, embodiments of the present invention may provide a mechanism by which a user can quickly learn information regarding why a particular content item is being recommended to the user. In this regard, for example, some embodiments of the present invention may provide for the delivery of a graphical symbol that may be indicative of recommendation criteria to be provided to the user in association with the particular content item. The graphical symbol may, in some instances, be overlaid on top of a graphical representation associated with the content item (e.g., album cover art). However, graphical symbols may also be provided in association with items in a list format. Although an example embodiment will be described below primarily in the context of music related content items, some embodiments could be practiced in the context of other media content items such as movies, books, articles, texts, journals, videos, maps, games, television or radio programs or channels, internet links or sites, files, and/or the like.

Figure 1:
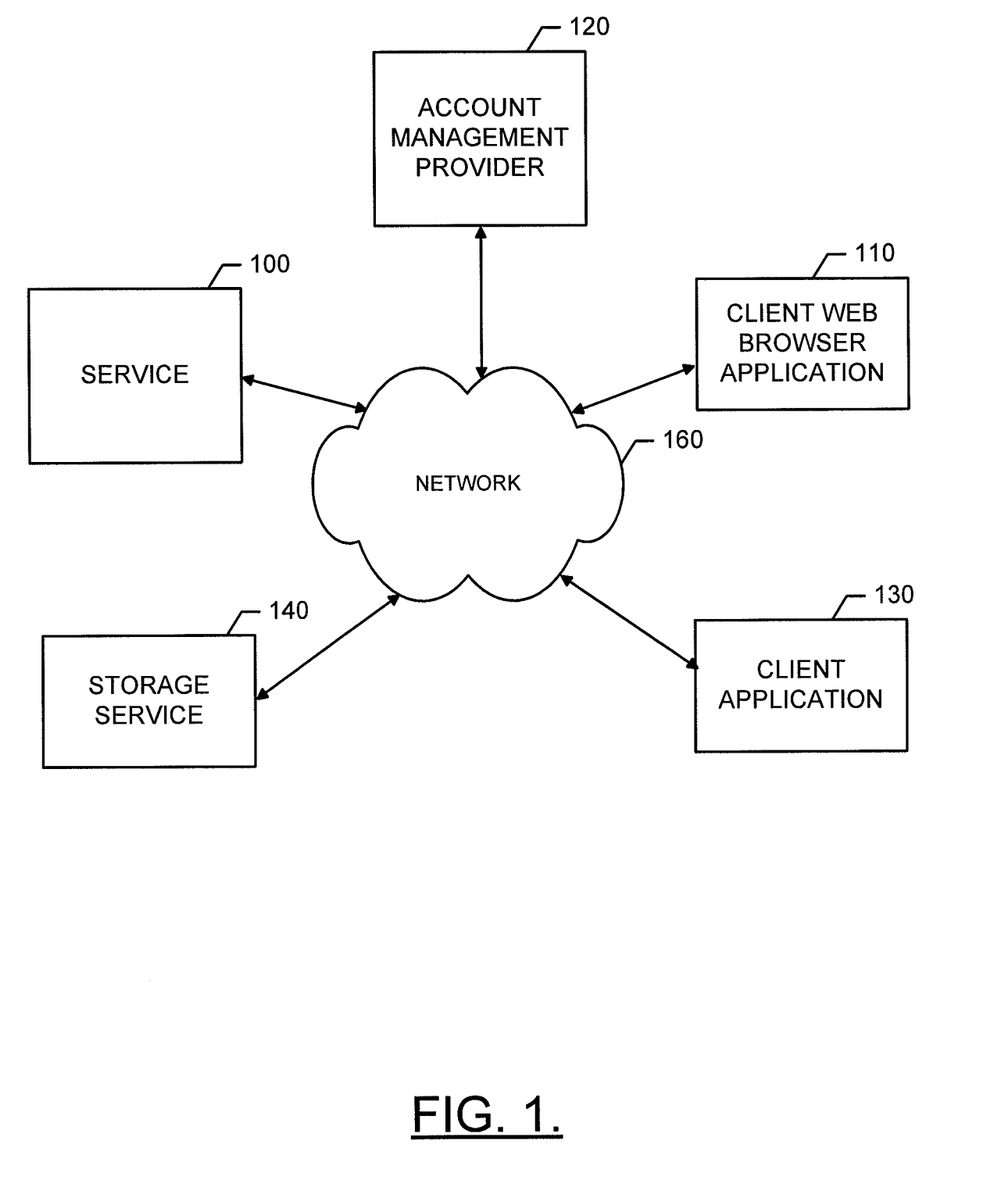
FIG. 1 is a schematic block diagram of a system according to an example embodiment of the present invention.

Referring now to FIG. 1, an embodiment of a system in accordance with an example embodiment of the present invention is illustrated. The system of FIG. 1 may include a service 100, a client web browser application 110, an account management provider 120, a client application 130, and a storage service 140. The service 100, the client web browser application 110, the account management provider 120, the client application 130, and the storage service 140 may be interconnected via the illustrated network 160. Furthermore, each of the service 100, the client web browser application 110, the account management provider 120, the client application 130, and the storage service 140 may be any device or means embodied in hardware, software or a combination of hardware and software configured for the performance of the corresponding functions of the service 100, the client web browser application 110, the account management provider 120, the client application 130, and the storage service 140, respectively, as described below.

In an example embodiment, the service 100, the account management provider 120, and the storage service 140, which may include memory, may collectively represent and/or employ an internet or network service (e.g., a website, a social networking website, a blog website, a web feed, a widget, a service platform, a server, and/or the like) that may receive and interact with requests from users via the client application 130 and/or the client web browser application 110. Various types of content, such as, but not limited to, music, audio, videos, pictures, maps, games, data files, books, text, journals, documents, messages, profile information, privacy options, television/radio programs or channels, internet sites or links, and/or the like, may be synchronized with and/or otherwise transferred to and from, the service 100. The service 100 may also enable users to transact business to acquire content via the service 100. In some cases the service 100 may enable users to utilize the storage service 140 for storage and retrieval of content by the service 100.

The account management provider 120 may operate together with the various other network entities to perform account management and security features. In some embodiments, login information and passwords are first directed to the account management provider 120 for verification. Upon verification, the account management provider 120 may provide access to, and allow communications between, various network entities using, for example, a token or other access key.

Client application 130 may be an application residing and operating on a platform (e.g., a user platform), such as a computer, mobile terminal, and/or the like, that may be used to interact with the service 300. The client application 130 may be downloaded to and/or installed on the platform. In some embodiments, the client application 130 may be specifically tailored to interact with the service 100, that is, the client application 130 may be a dedicated application. Via the client application 130, the platform, and the user of the platform, may interact with the service 100 to send, receive, and/or modify, as well as synchronize, content between the client application 130 and the service 100. The client application 130 may facilitate the gathering and storage of content for subsequent transmission to the service 100.

Similar to the client application 130, the client web browser application 10 may be an application residing and operating on a platform (e.g., a user platform), such as a computer, mobile terminal, and/or the like, that may be used to interact with the service 100. In this regard, the client web browser application 110 may be a generic network communication application for interacting with various network entities, including the service 100. Via the client web browser application 110, a platform, and the user of the platform, may interact with the service 100 to send, receive, and/or modify, as well as synchronize, data between the client web browser application 110 and the service 100. The client web browser application 110 may facilitate the gathering and storage of selections of privacy options and other data for subsequent transmission to the service 100.

In an example embodiment, the service 100 may provide users accessing the service 100 via the client application 130 or the client web browser application 110 with access to various content items. In some situations, a user may search for or otherwise access specific content desired by the user. In other situations, the user may receive content from other users or even network entities on a solicited or unsolicited basis. In still other situations, other users or network entities (e.g., the service 100) may provide recommendations to a particular user of the client application 130 and/or the client web browser application 110.

According to some embodiments of the present invention, the service 100 (or the device of the user (e.g., via the client web browser application 110 or the client application 130)) may provide a visual indication of a recommendation descriptor associated with the content recommended. Thus, for example, the indication may provide information regarding recommendation criteria such as a reason why the recommended content is being recommended to the user. As such, for example, the recommendation criteria may include factors such as an identity of the recommender, a context in which the content item is recommended for rendering, a context in which the content item is created, a context in which the recommendation for a context is created, a genre, artist, mood or the like of the content, an interest category, topic, subject, an advertiser, advertisement, and/or the like.

An example embodiment of the invention will now be described with reference to FIG. 2, in which certain elements of an apparatus for providing recommendation information are displayed. The apparatus 200 of FIG. 2 may be employed, for example, on the mobile terminal (e.g., mobile phone, mobile communication device, laptop, PDA, mobile telephone, audio/video player, camera, camcorder, GPS device, television, radio, game device and/or the like), server, personal computer, service provider, electronic device capable of running the service 100 or the client web browser application 110 or the client application 130 of FIG. 1, and/or the like. However, it should be noted that the apparatus 200 of FIG. 2, may also be employed on a variety of other devices, both mobile and fixed, and therefore, embodiments of the present invention should not be limited to application on devices such as those listed above. Alternatively, embodiments may be employed on a combination of devices including, for example, those listed above. Moreover, embodiments of the present invention may be embodied wholly at a single device or by a combination of devices such as when devices are in a client/server relationship. Furthermore, it should be noted that the devices or elements described below may not be mandatory and thus some may be omitted in certain embodiments.

Figure 2:
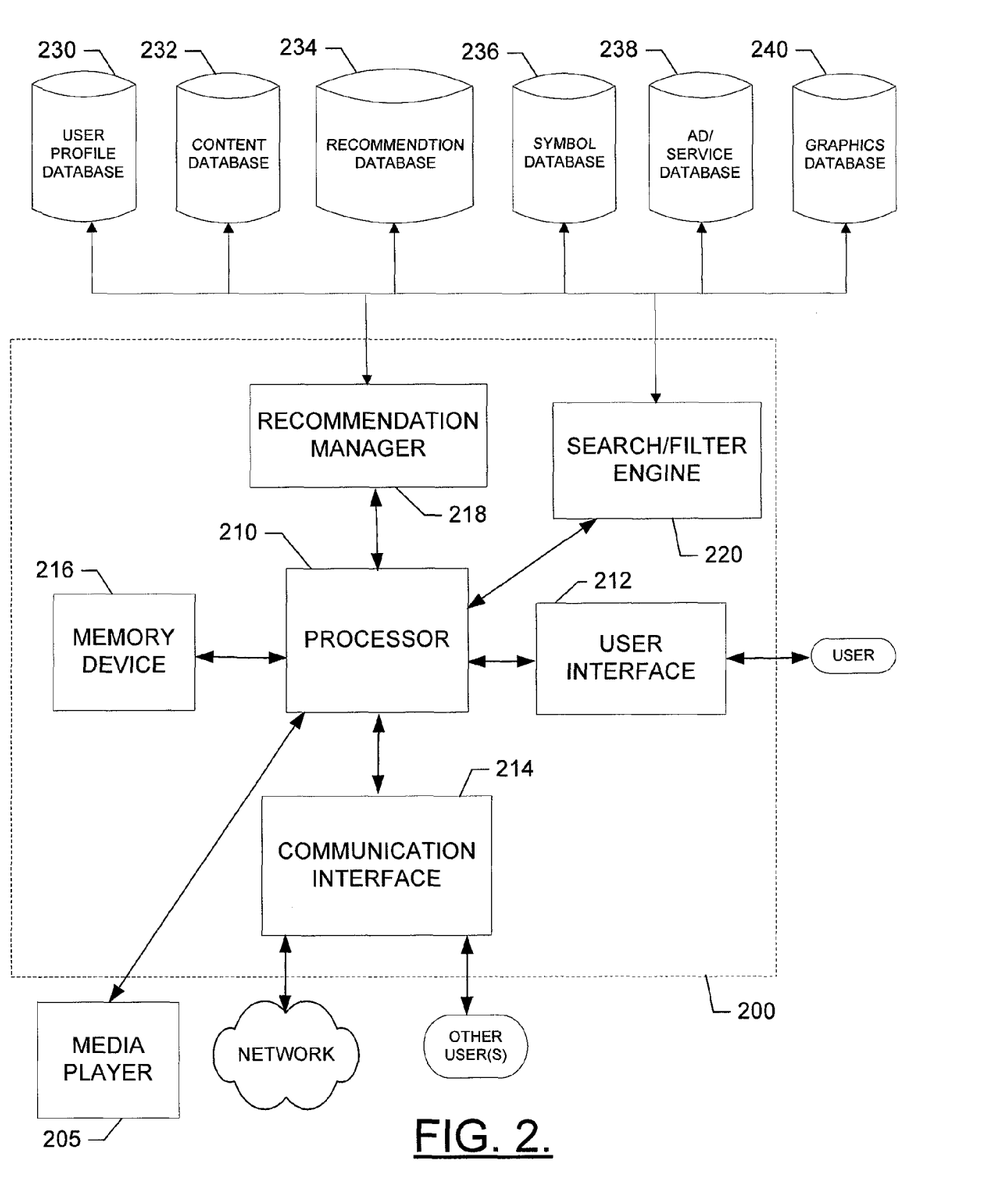
FIG. 2 is a schematic block diagram of an apparatus for providing indications regarding recommended content according to an example embodiment of the present invention.

Referring now to FIG. 2, an apparatus 200 for providing recommendation information is provided. The apparatus 200 may include or otherwise be in communication with a processor 210, a user interface 212, a communication interface 214 and a memory device 216. In an example embodiment, the apparatus 200 may include or otherwise be in communication with a media player 205. The media player 205 may include any of a number of different devices configured to provide playback and/or rendering capabilities with respect to media content or files. For example, the media player 205 may include a television (TV) monitor, wireless monitor, game console, personal computer (PC), stereo and home theater, video and imaging capture and/or playback device, multimedia mobile terminal, handheld music player, etc. In some embodiments, the media player 205 may be embodied as a virtual machine or computer program for rendering or playing back multimedia files via the display and/or speaker of a corresponding electronic device (e.g., a mobile terminal). As such, for example, the media player 205 may be configured to render audio from a music file and may also enable at least the rendering of an image or graphic associated with the music file (e.g., album cover or art material).

The memory device 216 may include, for example, volatile and/or non-volatile memory. The memory device 216 may be configured to store information, data, applications, instructions and/or the like for enabling the apparatus to carry out various functions in accordance with example embodiments of the present invention. For example, the memory device 216 could be configured to buffer input data for processing by the processor 210. Additionally or alternatively, the memory device 216 could be configured to store instructions for execution by the processor 210. As yet another alternative, the memory device 216 may be one of a plurality of databases that store information and/or media content.

The processor 210 may be embodied in a number of different ways. For example, the processor 210 may be embodied as various processing means such as a processing element, a coprocessor, a controller or various other processing devices including integrated circuits such as, for example, an ASIC (application specific integrated circuit), an FPGA (field programmable gate array), a hardware accelerator, and/or the like. In an example embodiment, the processor 210 may be configured to execute instructions stored in the memory device 216 or otherwise accessible to the processor 210.

Meanwhile, the communication interface 214 may be embodied as any device or means embodied in either hardware, software, or a combination of hardware and software that is configured to receive and/or transmit data from/to a network and/or any other device or module in communication with the apparatus. In this regard, the communication interface 214 may include, for example, an antenna and supporting hardware and/or software for enabling communications with a wireless communication network. In fixed environments, the communication interface 214 may alternatively or also support wired communication. As such, the communication interface 214 may include a communication modem and/or other hardware/software for supporting communication via cable, digital subscriber line (DSL), universal serial bus (USB) or other mechanisms.

The user interface 212 may be in communication with the processor 210 to receive an indication of a user input at the user interface 212 and/or to provide an audible, visual, mechanical or other output to the user. As such, the user interface 212 may include, for example, a keyboard, a mouse, a joystick, a touch screen, a display, a microphone, a speaker, or other input/output mechanisms. In an example embodiment in which the apparatus is embodied as a server, access point or some other network devices, the user interface 212 may be limited, or eliminated.

In an example embodiment, the processor 210 may be embodied as, include or otherwise control a recommendation manager 218 and a search/filter engine 220. The recommendation manager 218 and the search/filter engine 220 may each be any means such as a device or circuitry embodied in hardware, software or a combination of hardware and software that is configured to perform the corresponding functions of the recommendation manager 218 and the search/filter engine 220, respectively, as described below.

Either or both of the recommendation manager 218 and the search/filter engine 220 may be in communication with one or more databases that may store information useful in connection with embodiments of the present invention. The databases may include, for example, a user profile database 230, a content database 232, a recommendation database 234, a symbol database 236, an ad/service database 238, a graphics database 240 and/or the like. One or more of the databases may be a portion of the memory device 216. However, one or more of the databases may alternatively be separate databases accessible by the recommendation manager 218 and/or the search/filter engine 220 via the communication interface 214 and/or the network. In an example embodiment, one or more of the databases may be associated with a service platform (e.g., service 100).

The user profile database 230 may store information regarding user preferences, information descriptive of user interests, historical data regarding user content consumption or habits, and/or the like. As such, the user profile database 230 may store information indicative of genres preferred by the user, frequency data associated with consumption of content by genre, artists or bands preferred by the user or frequency data associated with consumption of content by artist or band, mood related preference information (e.g., energetic, romantic, etc.), context related preference information (e.g., in the gym, on the road, at work, etc.). The information stored in the user profile database 230 may be used, for example, by the recommendation manager 218 and/or the search/filter engine 220 for filtering recommendations to be provided or played at the media player 205 based on the user's preferences.

The content database 232 may store a plurality of content items of one or more different types or classes. For example, when utilized in connection with music related content, the content database 232 may store a plurality of music files in association with various different artists or bands, genres, moods, etc. In some cases, the content items may be stored in connection with metadata that may be indicative of the artist, band, release date, genre, mood, context, and/or the like, with which the respective content items are associated. The metadata may be used by the recommendation manager 218 and/or the search/filter engine 220 for learning information about a particular content item for use in filtering, searching and/or generating recommendations regarding the particular content item.

The recommendation database 234 may include information indicative of recommendations received regarding one or more content items that may be stored in the content database 232 and/or information for use in generating recommendations. As such, for example, the recommendation database 234 may store messages of recommendation from various other individuals or entities. In this regard, for example, if another user or a network entity provides a recommendation, either to a specific user or a general recommendation with regard to content item, the recommendation database 234 may store such recommendation permanently, until erased or replaced, or for a predetermined period of time. The recommendation need not be overt. As such, for example, if a particular individual or group of individuals listens to a song with a certain frequency, the song may be recommended to others. Furthermore, if a particular marketing agency requests or pays for the service of having their brand or product recommended, the recommendation database 234 may store information indicative of the recommendation to be provided. Moreover, in some instances, one or more individuals may merely make general recommendations to a service (e.g., service 100) and recommendations to one or more other individuals may be made based on the general recommendations received. The recommendation database 234 may be accessed by the recommendation manager 218 and/or the search/filter engine 220, as described in greater detail below, for accessing recommendation information for the provision of recommendations to users as provided herein.

The symbol database 236 may include a plurality of graphical symbols in which each symbol corresponds to a particular recommendation criterion. Thus, for example, recommendation criteria indicative of music considered desirable or good for listening while driving may include an image of a car, while a bicycle graphic may be indicative of music considered desirable for listening while bicycling. The graphical symbols may also include avatars, pictures, symbols or other indicia associated with a particular individual or entity recommending a particular content item. For example, if a friend recommends a content item, an image of the friend may be stored in the symbol database 236 for use in identifying content recommended by the friend.

In some embodiments, as described above, marketers may desire to recommend content items as an avenue for marketing their respective products or brands. Thus, for example, the ad/service database 238 may store graphic elements such as logos, photos, or other visual indicia of a particular product, brand, logo, trademark, and/or the like. The stored graphic elements may then be associated (e.g., via the recommendation manager 218 and/or the search/filter engine 220) with particular content recommended to a user as described in greater detail below.

In an example embodiment, the graphics database 240 may store images, graphical representations or other visual content associated with a content item being recommended. For example, in the context of music recommendations, the graphics database 240 may store album art or artist/band related art such as images of album covers, posters, band or artist photos, logos, and/or the like. The graphical representations stored in the graphics database 240 may also be accessed by the recommendation manager 218 and/or the search/filter engine 220 for use in connection with embodiments of the present invention as described in greater detail below.

The search/filter engine 220 may be configured to perform searches for content on the basis of recommendation criteria. Additionally or alternatively, the search/filter engine 220 may be configured to filter through recommendation information in order to provide recommendations to one or more users based at least in part on recommendation criteria. Other data considered by the search/filter engine 220 may include the interests of the user as specified, for example, in the user profile database 230. Thus, for example, the user's musical likes and/or dislikes may be determinable from the user profile database 230 along with information indicative of when, from whom, and/or under what circumstances the user is receptive to receiving recommendations or presentations of recommended content.

In an example embodiment, the search/filter engine 220 may be configured to parse recommendation messages in the recommendation database 234 for a particular user and, for recommendation messages that are indicative of a recommendation that complies with the user's profile, provide information to the recommendation manager 218 regarding the corresponding recommendation (e.g., an indication of a recommendation) to enable the recommendation manager 218 to generate an indication of recommendation criteria (e.g., via a graphical symbol associated with the recommendation criteria) for the corresponding recommendation. However, in some cases, compliance with the user's profile may not be a factor. The indication may then be served to the user or posted generally in a manner accessible to the user. In other words, in some embodiments, the search/filter engine 220 may be configured to filter recommendations from other users or entities regarding recommendations, in some cases further based on a particular user's interests (e.g., as specified in the user profile database 230). In alternative embodiments, the search/filter engine 220 may be configured to search information available via a service and generate indications of recommendations for use by the recommendation manager 218 as described below.

In this regard, for example, the search/filter engine 220 may be configured to parse recommendation information related to use statistics and/or service advertisements for a particular user and, for recommendation messages that are indicative of a recommendation that complies with the user's profile, provide information to the recommendation manager 218 regarding the corresponding recommendation to enable the recommendation manager 218 to generate an indication of recommendation criteria for the corresponding recommendation. However, in some cases, compliance with the user's profile may not be a factor. The indication may then be served to the user or posted generally in a manner accessible to the user. In other words, the search/filter engine 220 may be configured to determine recommendations based on other users' or entities' activities, in some cases further based on a particular user's interests (e.g., as specified in the user profile database 230).

The recommendation manager 218 may be configured to generate an indication of recommendation criteria to be displayed in association with recommended content. In this regard, for example, the recommendation manager 218 may be configured to display (or provide for display of) recommendation criteria for filtered or selected content items associated with a recommendation to be communicated to a user or recommended content to be served to or identified for the user. The recommendation criteria may be indicated by the graphical symbols of the symbol database 236. Thus, for example, a particular file may be played by or provided to a device of the user (e.g., a mobile terminal). Along with the particular file, a graphical symbol may be provided to indicate the reason for the recommendation based on the recommendation criteria.

The recommendation criteria may be standard criteria associated with a service (e.g., service 100) or may be user specific. As such, for example, each user may define categories, classes or types of content and select a corresponding graphical symbol from an existing database (e.g., the symbol database 236) or create each user's own graphical symbol(s) to be associated with different categories of content. The user profile database 230 may store portions of such personalized information. Each respective graphical symbol may then be recognized by the user when received along with a content item to indicate why the content item was provided to the user or perhaps what context in which the content item is recommended for use by the user. In an embodiment where standard symbols are used to correspond to recommendation criteria, the user may learn the meanings of each symbol over time or may be able to access information indicating the meaning of each symbol. In some embodiments, a standard group of symbols associated with the service may be augmented or modified by the user.

The recommendation criteria may be any of various different criteria. For example, a particular graphical symbol may be associated with various ones of the following including: top ten songs, new popular songs, groups or artists, frequently downloaded or rendered media content, content similar to a liked artist, genre, title, topic, subject, common band members, musical mood, context (e.g., car, home, bus, bicycling, vacation, etc.), specific metadata item, criteria, location, time, content a friend downloaded or listened, a band playing nearby, a content item popular with a particular demographic, advertisement, and/or like many other categories.

Figure 3A:
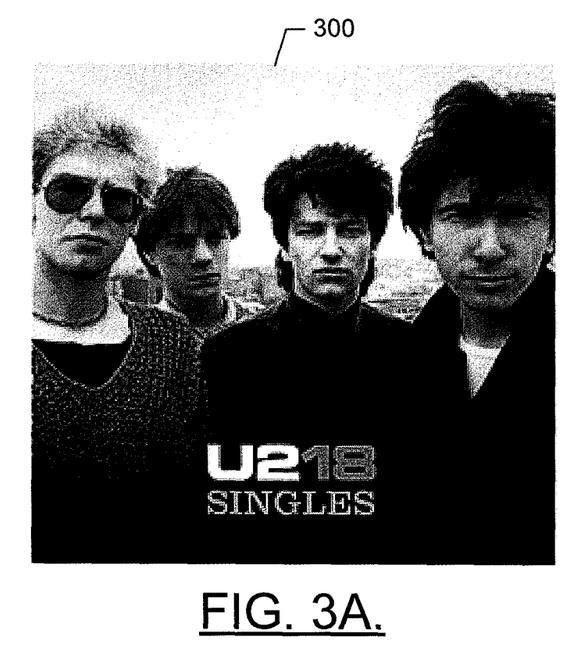
FIG. 3A illustrates an example graphical representation according to an example embodiment of the present invention.
Figure 3B:
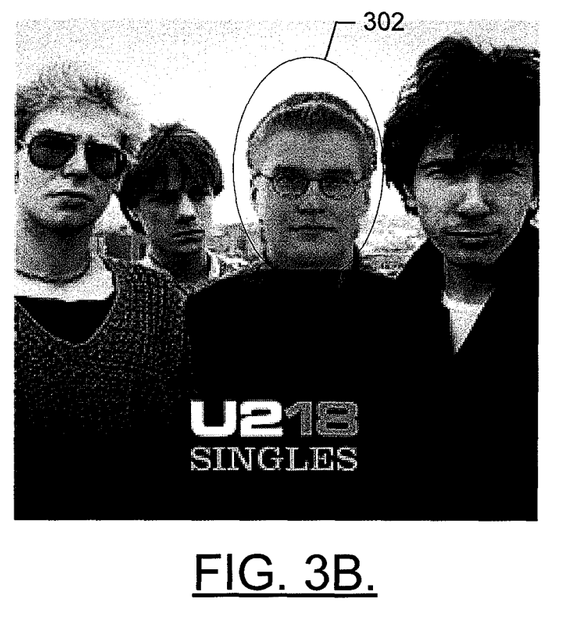
FIG. 3B illustrates the example graphical representation of FIG. 3A modified to include a graphical symbol indicative of recommendation criteria according to an example embodiment of the present invention.

In some embodiments, rather than merely providing the indication of the recommendation criteria via the graphical symbol, the recommendation manager 218 may provide further information along with the indication of the recommendation criteria. For example, the recommendation manager 218 may access the graphics database 240 to access album art associated with a particular music content item and provide the recommendation criteria as a graphical overlay on the album art. FIG. 3A shows an example of an album cover (e.g., a graphical representation 300 or other visual content associated with a content item being recommended) that may correspond to a particular music content item in accordance with an example embodiment of the invention. FIG. 3B shows the album cover as modified in accordance with an example embodiment of the invention. In this regard, as seen in FIG. 3B, a graphical symbol 302 is included as an overlay on top of the album cover image forming the graphical representation 300 of FIG. 3A. In FIG. 3B, one of the faces of a band member has been replaced (or covered) with a face of the individual recommending the content item to the user (or individual who listened to the song and thus by virtue of such action formed the basis for the recommendation provided to the user).

The graphical symbol 302, which in this case is an image of a particular individual, may have been stored in a local database (e.g., at a mobile terminal) or in a remote database (e.g., a network server or a database associated with the service 100) such as the symbol database 236. In some cases, the service 100 may be a service platform managing music content and contact information and therefore including an image corresponding to various contacts of the user for use in identifying content recommended or used by a particular one of the contacts. As an alternative, the graphical symbol 302 could be an image of an object corresponding to any particular recommendation criteria. Furthermore, in some cases, the graphical symbol 302 could be an image of a particular brand of product or an advertisement. Thus, recommendation criteria could also include advertisements and the graphical symbol 300 could be an ad indicating the reason for the corresponding recommendation.

The recommendation manager 218 may be configured to determine at which location of the graphical representation 300 of the content item the graphical symbol 302 is to be placed. As such, for example, the recommendation manager 218 may be configured to access the graphical representation 300 (e.g., from the graphics database 240) and determine or detect different objects or features such as faces, shapes, edges, text regions, relatively empty regions, and/or the like using image feature recognition techniques. The recommendation manager 218 may then determine at what location and/or in what color, size, font, style, etc., the graphical symbol 302 should be overlaid onto the graphical representation 300. Rules regarding the conditions under which certain characteristics (e.g., size, location, font, color, and/or the like) for the graphical symbol 302 are to be employed may be stored, for example, in the memory device 216. As an alternative, either a user receiving recommendations or an entity providing recommendations may select the type and appearance of the graphical symbol 302 (e.g., from options in the symbol database 236, or by creating the graphical symbol 302). Thus, the graphical symbol 302 may come or be downloaded as part of a content item recommended, or may be retrieved from a database or server based on various criteria as described herein.

In the example of FIG. 3B, the face of the graphical symbol 302 was used to overlay and replace another face from the graphical representation 300. Thus, for example, the recommendation manager 218 may have used feature recognition software and/or hardware to identify faces in the graphical representation 300 in order to determine a corresponding size of the graphical symbol 302 to enable coverage of a face selected for replacement by the recommendation manager 218. In other words, the recommendation manager 218 may employ an algorithm for determining face size of an object in the image and resize the graphical symbol 302 (and/or recolor or perform other changes to the appearance of the graphical symbol 302) in order to provide a suitable size for replacing the original face in the graphical representation 300. Alternatively, the graphical symbol 302 may have been placed in a relatively empty location, proximate to text such as the title or artist name, proximate to an edge, or in replacement of an object having a similar shape to that of the graphical symbol 302. Colors of the graphical symbol 302 may be altered in order to better match or standout from the colors used in the graphical representation 300.

In some situations, wherever a specific object is located, and the object bears resemblance to an object for which an ad is available, the ad may replace such object. Alternatively, if a graphical symbol 302 of a particular type (e.g., motorcycle, shoe or other product) is to be overlaid on a particular graphical representation, and the ad/service database 238 includes an object corresponding to the object of the graphical symbol 302 (e.g., a motorcycle or shoe made by a particular advertiser who paid the service 100 for advertising services), the graphical symbol 302 may be replaced by a corresponding symbol or advertisement from the ad/service database 238. The advertisement may include special offers or even a link to a coupon or other information related to the product or special offer. Thus, the recommendation manager 218 may be configured to match a graphical symbol with a corresponding advertisement from the ad/service database 238.

Figure 4:
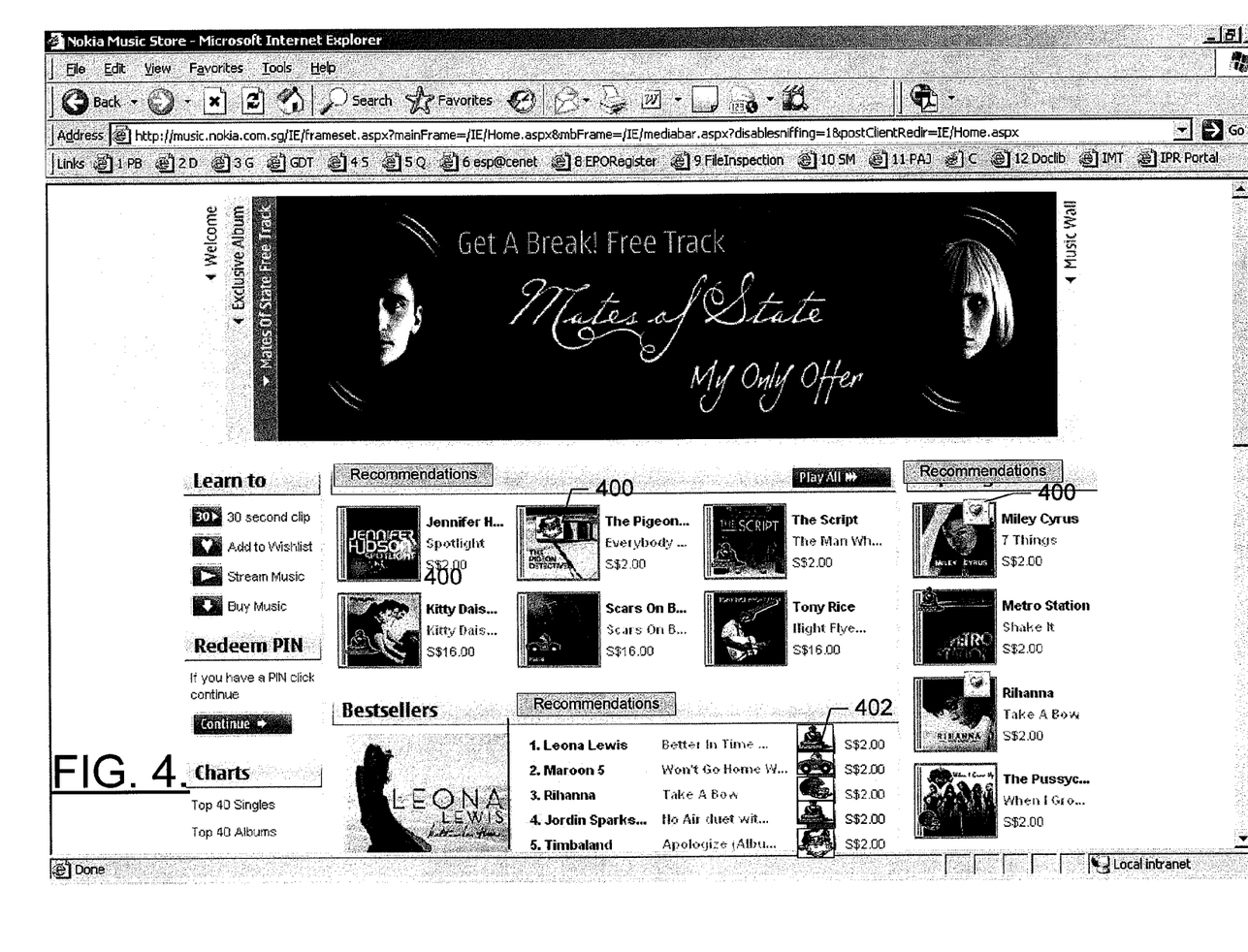
FIG. 4 shows an example web page of a service providing recommendations according to an example embodiment of the present invention.

In an example embodiment, the functionality of the recommendation manager 218 may be employed with respect to recommended music or other content items being played at a device (e.g., the media player 205). As such, for example, if the media player 205 is in a mode that enables a recommended content item to be automatically played or added to a playlist, the recommendation manager 218 may operate to present album cover art (or other graphical representations associated with a content item to be played) as modified by inclusion of the graphical symbol 302 in response to the content item beginning to play. However, as an alternative, listings of recommended songs or other content items (e.g., as provided by an online music store or other music service) may be provided in which one or more (or even all) of the recommended songs or other content items include respective graphical symbols indicative of the recommendation criteria for each corresponding recommended song. In this regard, for example, FIG. 4, in accordance with an example embodiment of the invention, shows an example web page associated with a music related service (e.g., service 100) in which various recommended content items may be displayed. As shown in FIG. 4, some (or all) of the recommended content items include respective graphical symbols to indicate the recommendation criteria associated with each recommended content item. The graphical symbols may be included on album cover art as indicated by graphical symbols 400 or may be provided in association with content items, but independent of album cover art as indicated by graphical symbols 402.

In some cases, the recommendation manager 218 may be configured to operate for recommendations received from either a server (e.g., associated with the service 100) or from a peer device (e.g., another mobile terminal or PC) on a continuous basis. However, in alternative cases, the user may activate or deactivate the recommendation manager 218. Thus, for example, the graphical symbols 400/402 could be turned off so the user could view the original album art without modification. In other words, the user may be able to view the graphical representation with or without the additional layer. Accordingly, for example, some of the various embodiments of the present invention may provide a fun and entertaining way to see why a song or other content item has been recommended to the user by a music service, a friend, and/or the like. Moreover, embodiments of the present invention may provide for an automatic display of cover art without user interaction, e.g., the user need not select the content item for playing or displaying of the cover art in order for the recommended content item's cover art to be displayed and/or for the corresponding content item to be rendered. In embodiments in which the recommendation comes via a server application (e.g., via the service 100), the recommendation (and possibly also the corresponding graphical symbol) may be displayed via the server application (e.g., on a web page). Alternatively, in embodiments in which the recommendation coves via a peer device, the recommendation (and possibly also the corresponding graphical symbol) may be displayed only on a client side application.

Figure 5:
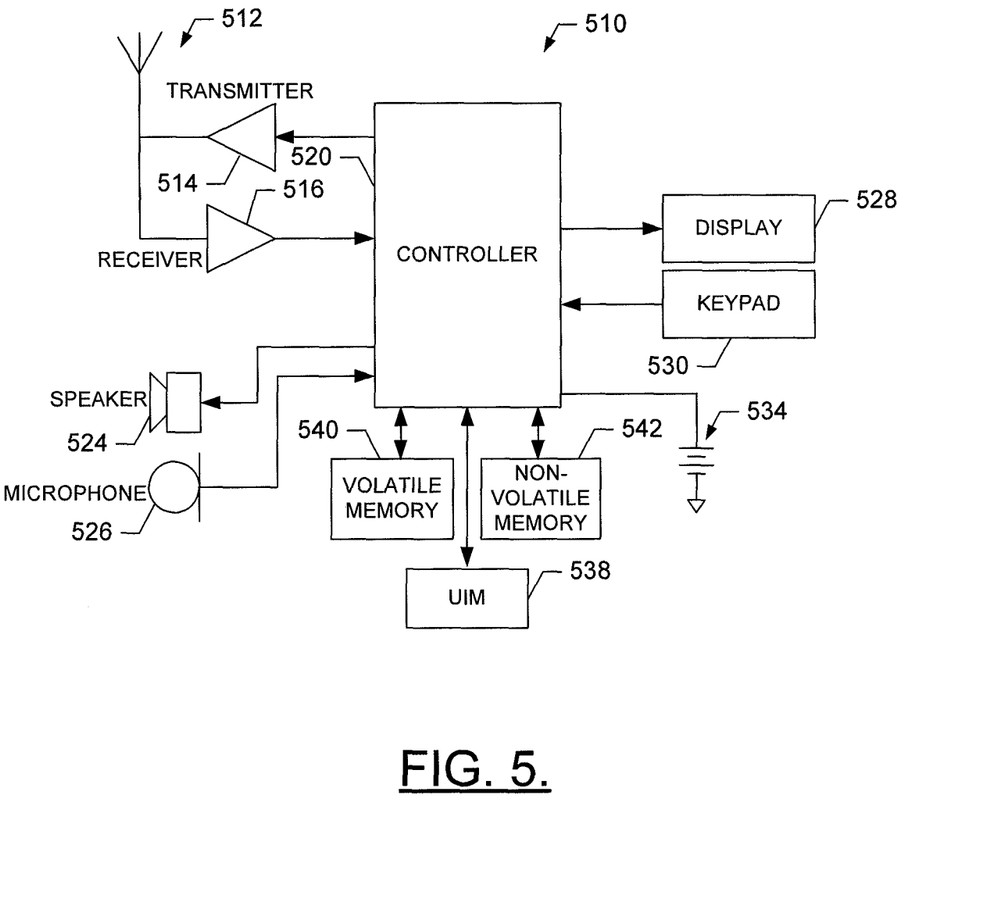
FIG. 5 is a schematic block diagram of a mobile terminal according to an example embodiment of the present invention.

FIG. 5 illustrates a block diagram of a mobile terminal 510 that may benefit from example embodiments of the present invention. It should be understood, however, that a mobile terminal as illustrated and hereinafter described is merely illustrative of one type of mobile terminal that may benefit from some embodiments of the present invention and, therefore, should not be taken to limit the scope of embodiments of the present invention. Several types of mobile terminals, such as mobile phones, mobile communication devices, portable digital assistants (PDAs), pagers, mobile televisions, gaming devices, all types of computers (e.g., laptops or mobile computers), cameras, camcorders, audio/video players, radio, global positioning system (GPS) devices, or any combination of the aforementioned, and other types of communications systems, can readily employ embodiments of the present invention. The mobile terminal 510 may be an example of the apparatus 200 of FIG. 2. However, as indicated above, the apparatus 200 of FIG. 2 could alternatively be embodied as the service 100 of FIG. 1 or even some other device.

The mobile terminal 510 may include an antenna 512 (or multiple antennas) in operable communication with a transmitter 514 and a receiver 516. The mobile terminal 510 may further include an apparatus, such as a controller 520 or other processing element, that provides signals to and receives signals from the transmitter 514 and receiver 516, respectively. The signals may include signaling information in accordance with any of numerous wireless communication standards. In this regard, the mobile terminal 510 may be capable of operating with one or more air interface standards, communication protocols, modulation types, and access types.

It is understood that the apparatus, such as the controller 520, may include circuitry for implementing, among others, audio/video and logic functions of the mobile terminal 510. For example, the controller 520 may comprise a digital signal processor device, a microprocessor device, and various analog to digital converters, digital to analog converters, and/or other support circuits. Control and signal processing functions of the mobile terminal 510 may be allocated between these devices according to their respective capabilities. The controller 520 thus may also include the functionality to encode and interleave message and data prior to modulation and transmission. The controller 520 may additionally include an internal voice coder, and may include an internal data modem. Further, the controller 520 may include functionality to operate one or more software programs, which may be stored in memory. For example, the controller 520 may be capable of operating a connectivity program, such as a conventional web browser. The connectivity program may then allow the mobile terminal 510 to transmit and receive web content, such as location-based content and/or other web page content, according to a Wireless Application Protocol (WAP), Hypertext Transfer Protocol (HTTP) and/or the like, for example.

The mobile terminal 510 may also comprise a user interface including an output device such as an earphone or speaker 524, a microphone 526, a display 528, and a user input interface, which may be operationally coupled to the controller 520. The user input interface, which allows the mobile terminal 510 to receive data, may include any of a number of devices allowing the mobile terminal 510 to receive data, such as a keypad 530, a touch display (not shown) or other input device. In embodiments including the keypad 530, the keypad 530 may include numeric (0-9) and related keys (#, *), and other hard and soft keys used for operating the mobile terminal 510. Alternatively, the keypad 530 may include a QWERTY keypad arrangement. The keypad 530 may also include various soft keys with associated functions. In addition, or alternatively, the mobile terminal 510 may include an interface device such as a joystick or other user input interface. The mobile terminal 510 further includes a battery 534, such as a vibrating battery pack, for powering various circuits that are used to operate the mobile terminal 510, as well as optionally providing mechanical vibration as a detectable output.

The mobile terminal 510 may further include a user identity module (UIM) 538. The UIM 538 is typically a memory device having a processor built in. The UIM 538 may include, for example, a subscriber identity module (SIM), a universal integrated circuit card (UICC), a universal subscriber identity module (USIM), a removable user identity module (R-UIM), etc. The UIM 538 typically stores information elements related to a mobile subscriber. In addition to the UIM 538, the mobile terminal 510 may be equipped with memory. The mobile terminal 510 may include volatile memory 540 and/or non-volatile memory 542. For example, volatile memory 540 may include Random Access Memory (RAM) including dynamic and/or static RAM, on-chip or off-chip cache memory, and/or the like. Non-volatile memory 542, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 540 non-volatile memory 542 may include a cache area for temporary storage of data. The memories can store any of a number of pieces of information, and data, used by the mobile terminal 510 to implement the functions of the mobile terminal 510.

Figure 6:
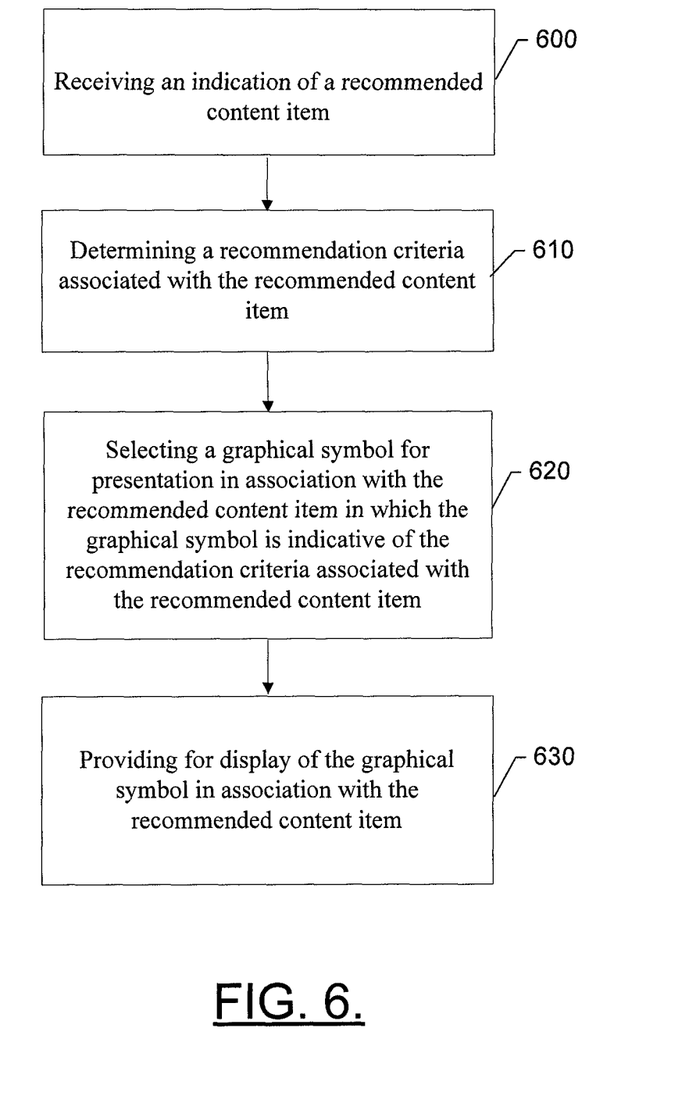
FIG. 6 is a flowchart according to an example method of providing indications regarding recommended content according to an example embodiment of the present invention.

FIG. 6 is a flowchart of a system, method and program product according to example embodiments of the invention. It will be understood that each block or step of the flowchart, and combinations of blocks in the flowchart, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device and executed by a processor (e.g., the processor 210). As will be appreciated, any such computer program instructions may be loaded onto a computer or other programmable apparatus (i.e., hardware) to produce a machine, such that the instructions which execute on the computer or other programmable apparatus create means for implementing the functions specified in the flowchart block(s) or step(s). Further, the functions specified in the flowchart block(s) or step(s) may be executed in any order. These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that one or more blocks or steps of the flowchart, and combinations of blocks or steps in the flowcharts, can be implemented by special purpose hardware-based computer systems which perform the specified functions or steps, or combinations of special purpose hardware and computer instructions.

In this regard, one embodiment of a method for providing indications regarding recommended content items as provided in FIG. 6 may include receiving an indication of a recommended content item at operation 600 and determining a recommendation criteria associated with the recommended content item at operation 610. The method may further include selecting a graphical symbol for presentation in association with the recommended content item in which the graphical symbol is indicative of the recommendation criteria associated with the recommended content item at operation 620. At operation 630, the method may further include providing for display of the graphical symbol in association with the recommended content item.

In an example embodiment, receiving the indication may include filtering a plurality of content items on the basis of a user profile and providing the indication with respect to a content item matching user preferences specified in the user profile. In some cases, receiving the indication may further include filtering content items associated with at least one of a plurality of new music content items, a plurality of music content items recommended by an external message relative to a music service, or a plurality of music content items recommended by an internal message of the music service on the basis of the user profile. Alternatively, receiving the indication may include filtering a plurality of content items on the basis of activity of another party and providing the indication with respect to a content item upon which the other party acted in a predefined manner.

In an example embodiment, determining the recommendation criteria may include determining the recommendation criteria based on metadata associated with the recommended content item or determining with which category a particular music content item corresponds in relation to at least one of genre, artist, context or mood.

In an example embodiment, selecting the graphical symbol may include selecting a graphic associated with an entity providing a recommendation of the recommended content item or selecting at least one of an image of a person providing the recommendation and an advertisement associated with the entity.

In some embodiments, providing for display of the graphical symbol further may include providing the graphical symbol as an overlay on a graphical representation associated with the recommended content item. Alternatively, providing for display of the graphical symbol may further include recognizing an element within the graphical representation and determining characteristics of the graphical symbol based on the recognized element. As yet another alternative, providing for display of the graphical symbol may further include providing a list of content items and a corresponding list of graphical symbols for the content items based on the respective recommendation criteria of each content item.

In an example embodiment, an apparatus for performing the method above may include a processor (e.g., the processor 210) configured to perform each of the operations (600-630) described above. The processor may, for example, be configured to perform the operations by executing stored instructions or an algorithm for performing each of the operations. Alternatively, the apparatus may include means for performing each of the operations described above. In this regard, according to an example embodiment, examples of means for performing operations 600 to 630 may include, for example, the recommendation manager 218, the search/filter engine 220, and/or the processor 210.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
receiving an indication of a recommended content item;
determining a recommendation criteria associated with the recommended content item;
determining to select a graphical symbol for presentation in association with the recommended content item, wherein the graphical symbol is indicative of the recommendation criteria associated with the recommended content item;
determining to provide further information along with the indication of the recommendation criteria; and
determining to display the graphical symbol in association with the recommended content item as a graphical overlay on the further information,
wherein a graphic associated with an entity providing a recommendation of the recommended content item is selected, the selected graphic being at least one of an image of a person providing the recommendation and an advertisement associated with the entity.

2. The method of claim 1, further comprising:
filtering a plurality of content items on the basis of a user profile; and
providing the indication with respect to a content item matching user preferences specified in the user profile.

3. The method of claim 2, further comprising:
filtering content items associated with at least one of a plurality of new music content items, a plurality of music content items recommended by an external message relative to a music service, or a plurality of music content items recommended by an internal message of the music service on the basis of the user profile.

4. The method of claim 1, further comprising:
filtering a plurality of content items on the basis of activity of another party; and
providing the indication with respect to a content item upon which the other party acted in a predefined manner.

5. The method of claim 1, wherein the determination of the recommendation criteria is further based on metadata associated with the recommended content item.

6. The method of claim 1, wherein the recommended content item is associated with music and determining the recommendation criteria comprises determining an association of a particular music content item with a category of music.

7. The method of claim 1, wherein the further information comprises a graphical representation associated with the recommended content item.

8. The method of claim 7, wherein determining to display the graphical symbol further comprises recognizing an element within the graphical representation and determining characteristics of the graphical symbol based on the recognized element.

9. The method of claim 1, wherein determining to display the graphical symbol further comprises providing a list of content items and a corresponding list of graphical symbols for the content items based on the respective recommendation criteria of each content item.

10. A computer program product comprising at least one non-transitory computer-readable storage medium carrying one or more sequences of one or more instructions which, when executed by one or more processors, cause an apparatus to at least perform the following steps:
receive an indication of a recommended content item;
determining a recommendation criteria associated with the recommended content item;
determining to select a graphical symbol for presentation in association with the recommended content item, wherein the graphical symbol is indicative of the recommendation criteria associated with the recommended content item;
determining to provide further information along with the indication of the recommendation criteria; and
determining to display the graphical symbol in association with the recommended content item as a graphical overlay on the further information,
wherein a graphic associated with an entity providing a recommendation of the recommended content item is selected, the selected graphic being at least one of an image of a person providing the recommendation and an advertisement associated with the entity.

11. The computer program product of claim 10, wherein the apparatus is further caused to filter a plurality of content items on the basis of a user profile and provide the indication with respect to a content item matching user preferences specified in the user profile.

12. The computer program product of claim 11, wherein the apparatus is further caused to filter content items associated with at least one of a plurality of new music content items, a plurality of music content items recommended by an external message relative to a music service, or a plurality of music content items recommended by an internal message of the music service on the basis of the user profile.

13. The computer program product of claim 10, wherein the apparatus is further caused to filter a plurality of content items on the basis of activity of another party and providing the indication with respect to a content item upon which the other party acted in a predefined manner.

14. The computer program product of claim 10, wherein the determination of the recommendation criteria is further based on metadata associated with the recommended content item.

15. The computer program product of claim 10, wherein the recommended content item is associated with music and the apparatus is further caused to determine an association of a particular music content item with a category of music.

16. The computer program product of claim 10, wherein the further information comprises a graphical representation associated with the recommended content item.

17. The computer program product of claim 16, wherein the apparatus is further caused to recognize an element within the graphical representation and determine characteristics of the graphical symbol based on the recognized element.

18. The computer program product of claim 10, wherein the apparatus is further caused to provide a list of content items and a corresponding list of graphical symbols for the content items based on the respective recommendation criteria of each content item.

19. An apparatus comprising:
- at least one processor; and
- at least one memory including computer program code for one or more programs, the at least one memory and the computer program code configured to, with the at least one processor, cause the apparatus to perform at least the following:
- receive an indication of a recommended content item;
- determine a recommendation criteria associated with the recommended content item;
- determine to select a graphical symbol for presentation in association with the recommended content item in which the graphical symbol is indicative of the recommendation criteria associated with the recommended content item;
- determine to provide further information along with the indication of the recommendation criteria; and
- determine to display the graphical symbol in association with the recommended content item as a graphical overlay on the further information,
- wherein a graphic associated with an entity providing a recommendation of the recommended content item is selected, the selected graphic being at least one of an image of a person providing the recommendation and an advertisement associated with the entity.

20. The apparatus of claim 19, wherein the apparatus is further caused to receive the indication by filtering a plurality of content items on the basis of a user profile and providing the indication with respect to a content item matching user preferences specified in the user profile.

21. The apparatus of claim 20, wherein the plurality of content items is associated with at least one of a plurality of new music content items, a plurality of music content items recommended by an external message relative to a music service, or a plurality of music content items recommended by an internal message of the music service on the basis of the user profile.

22. The apparatus of claim 19, wherein the apparatus is further caused to receive the indication by filtering a plurality of content items on the basis of activity of another party and providing the indication with respect to a content item upon which the other party acted in a predefined manner.

23. The apparatus of claim 19, wherein the apparatus is further caused to determine the recommendation criteria based on metadata associated with the recommended content item.

24. The apparatus of claim 19, wherein the plurality of content items is associated with music and the apparatus is further caused to determine the recommendation criteria by determining an association of a particular music content item with a category.

25. The apparatus of claim 19, wherein the further information comprises a graphical representation associated with the recommended content item.

26. The apparatus of claim 25, wherein the apparatus is further caused to display the graphical symbol by recognizing an element within the graphical representation and determining characteristics of the graphical symbol based on the recognized element.

27. The apparatus of claim 19, wherein the apparatus comprises a mobile terminal including a display and wherein the apparatus is further caused to display the graphical symbol by providing a list of content items and an associated list of graphical symbols for the content items based on the respective recommendation criteria of each content item.

28. The apparatus of claim 24, wherein the category includes at least one of genre, artist, context or mood.

* * * * *